United States Patent
Adar

(10) Patent No.: US 9,971,573 B2
(45) Date of Patent: May 15, 2018

(54) COMPUTING PLATFORM AND METHOD THEREOF FOR SEARCHING, EXECUTING, AND EVALUATING COMPUTATIONAL ALGORITHMS

(71) Applicant: The Joan and Irwin Jacobs Technion-Cornell Institute, New York, NY (US)

(72) Inventor: Simon Adar, Tenafly, NJ (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 0 days. days.

(21) Appl. No.: 15/185,513

(22) Filed: Jun. 17, 2016

(65) Prior Publication Data

US 2016/0371175 A1   Dec. 22, 2016

Related U.S. Application Data

(60) Provisional application No. 62/181,451, filed on Jun. 18, 2015, provisional application No. 62/271,800, filed on Dec. 28, 2015.

(51) Int. Cl.
| | |
|---|---|
| *G06F 9/44* | (2018.01) |
| *G06F 9/455* | (2018.01) |
| *G06F 11/34* | (2006.01) |

(52) U.S. Cl.
CPC ............ *G06F 8/36* (2013.01); *G06F 9/45504* (2013.01); *G06F 11/3428* (2013.01)

(58) Field of Classification Search
CPC ............................... G06F 8/36; G06F 11/3428
USPC ........................................................ 717/125
See application file for complete search history.

(56) References Cited

U.S. PATENT DOCUMENTS

| | | | |
|---|---|---|---|
| 6,546,418 B2 | 4/2003 | Schena et al. | |
| 6,775,824 B1 * | 8/2004 | Osborne, II | ........ G06F 11/3664 714/46 |
| 7,003,777 B2 * | 2/2006 | Hines | ........................ G06F 8/36 709/223 |

(Continued)

FOREIGN PATENT DOCUMENTS

| | | |
|---|---|---|
| WO | 2001077882 A1 | 10/2001 |
| WO | 2012054016 A1 | 4/2012 |
| WO | 2015020722 A1 | 2/2015 |

OTHER PUBLICATIONS

Arcuri et al., "A Memetic Algorithm for Test Data Generation of Object-Oriented Software", IEEE, 2007, 8pg.*

(Continued)

*Primary Examiner* — Ryan D. Coyer
(74) *Attorney, Agent, or Firm* — M&B IP Analysts, LLC

(57) ABSTRACT

A method and system for evaluating computational algorithms are provided. The method comprises receiving a textual description of a computational algorithm; generating a software container based on the received textual description; instantiating a computing environment on a computing device, wherein the computing environment includes computing resources configured to support execution of the software container; executing the software container in the computing environment; and displaying, on a user device, results that are output in response to execution of the software container.

30 Claims, 4 Drawing Sheets

(56) References Cited

U.S. PATENT DOCUMENTS

| | | | |
|---|---|---|---|
| 7,159,224 B2* | 1/2007 | Sharma | G06F 8/10 |
| | | | 719/310 |
| 8,373,724 B2 | 2/2013 | Ratnakar et al. | |
| 8,510,712 B1* | 8/2013 | Killmar, III | G06F 11/3684 |
| | | | 717/124 |
| 8,527,943 B1* | 9/2013 | Chiluvuri | G06F 8/36 |
| | | | 717/106 |
| 9,047,542 B2 | 6/2015 | Graushar et al. | |
| 2002/0069240 A1 | 6/2002 | Berk | |
| 2003/0142819 A1 | 7/2003 | Bellocchio | |
| 2005/0278622 A1 | 12/2005 | Betts et al. | |
| 2007/0033440 A1* | 2/2007 | Tillmann | G06F 11/3684 |
| | | | 714/38.14 |
| 2007/0150821 A1 | 6/2007 | Thunemann et al. | |
| 2007/0272733 A1 | 11/2007 | Spector | |
| 2008/0007779 A1 | 1/2008 | Gennip et al. | |
| 2008/0091938 A1 | 4/2008 | Pedersen et al. | |
| 2009/0108057 A1* | 4/2009 | Mu | H04M 1/72561 |
| | | | 235/375 |
| 2009/0158153 A1 | 6/2009 | Courteaux | |
| 2011/0107316 A1 | 5/2011 | Gutz et al. | |
| 2012/0054716 A1* | 3/2012 | Tailliez | G06F 8/61 |
| | | | 717/107 |
| 2013/0132774 A1* | 5/2013 | Somendra | G06F 11/3688 |
| | | | 714/32 |
| 2013/0276068 A1* | 10/2013 | Alwar | G06F 21/53 |
| | | | 726/4 |
| 2013/0298109 A1* | 11/2013 | Trinchini | G06F 8/71 |
| | | | 717/121 |
| 2015/0128105 A1* | 5/2015 | Sethi | G06F 8/36 |
| | | | 717/106 |
| 2016/0026442 A1* | 1/2016 | Chhaparia | G06F 9/45508 |
| | | | 717/139 |

OTHER PUBLICATIONS

Marinescu et al., "COVRIG: A Framework for the Analysis of Code, Test, and Coverage Evolution in Real Software", ACM, 2014, 12pg.*

The International Search Report and the Written Opinion for PCT/US2016/038053, ISA/RU, Moscow, Russia, dated Oct. 13, 2016.

The International Searching Authority and the Written Opinion for PCT/US2016/038050, ISA/RU, Moscow, Russia, dated Oct. 13, 2016.

The International Search Report and the Written Opinion of the International Searching Authority for PCT/US2017/043120, ISA/RU, Moscow, RU, dated Nov. 2, 2017.

* cited by examiner

COMPUTING PLATFORM AND METHOD THEREOF FOR SEARCHING, EXECUTING, AND EVALUATING COMPUTATIONAL ALGORITHMS

CROSS REFERENCE TO RELATED APPLICATIONS

This application claims the benefit of U.S. Provisional Application No. 62/181,451 filed on Jun. 18, 2015 and U.S. Provisional Application No. 62/271,800 filed on Dec. 28, 2015, the contents of which are hereby incorporated by reference.

TECHNICAL FIELD

The disclosure generally relates to the field of computer programming tools, and in particular to a computing platform and method to assist in programming, researching, evaluating, and maintenance of computational algorithms.

BACKGROUND

As the development of software applications evolves, programming accurate and efficient code has become a real challenge. A typical software application interfaces with different modules, e.g., using APIs, and should be programmed to enable its execution on different platforms and operating systems. For example, a software application (app) should be available for execution over different types of operating systems, such as Linux®, Mac OS® and Windows®. Furthermore, as execution of most software applications have been migrated to cloud computing infrastructures, the code should be written such that its execution is supported by any computing environments in the cloud infrastructure. Thus, in sum, the complexity of software applications imposes a real challenge on programmers.

In order to enable the development of rapid creation, setup, and deployment of applications, resources that include "off-the-shelf" functions, algorithms, and pieces of codes are available. Such resources range from academic and scientific publications to code repositories (e.g., GitHub). However, such resources are limited as they cannot provide executable code that can be easily evaluated and integrated in a software application or project being researched or developed. For example, a scientific publication (e.g., in an IEEE® article) would include a textual description of an algorithm or at best its pseudo code.

In most cases, scientific publications do not include any code that can be immediately executed on a computing environment for which the software application is developed. Thus, to evaluate the functionality and performance of the algorithm, executable code should be written and tested on that computing environment. This is a time consuming and error prone task. At best, a scientific publication would include a link to code repository that provides a sample code. However, this would still require the programmer to integrate the code in a software program for further evaluation.

Furthermore, due to the voluminous amount of academic and scientific publications, open-source codes, and other algorithm resources, it is almost impossible to effectively search for the right algorithm that would fit into a software application and would perform an intended function.

It would therefore be advantageous to provide a solution that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein includes a method for evaluating computational algorithms. The method comprises receiving a textual description of a computational algorithm; generating a software container based on the received textual description; instantiating a computing environment on a computing device, wherein the computing environment includes computing resources configured to support execution of the software container; executing the software container in the computing environment; and displaying, on a user device, results that are output in response to execution of the software container.

Certain embodiments disclosed herein also include a system for evaluating computational algorithms. The system comprises a processing system; and a memory, the memory containing instructions that, when executed by the processing system, configure the system to: receive a textual description of a computational algorithm; generate a software container based on the received textual description; instantiate a computing environment on a computing device, wherein the computing environment includes computing resources configured to support execution of the software container; execute the software container in the computing environment; and display, on a user device, results that are output in response to execution of the software container.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

Figure 1:
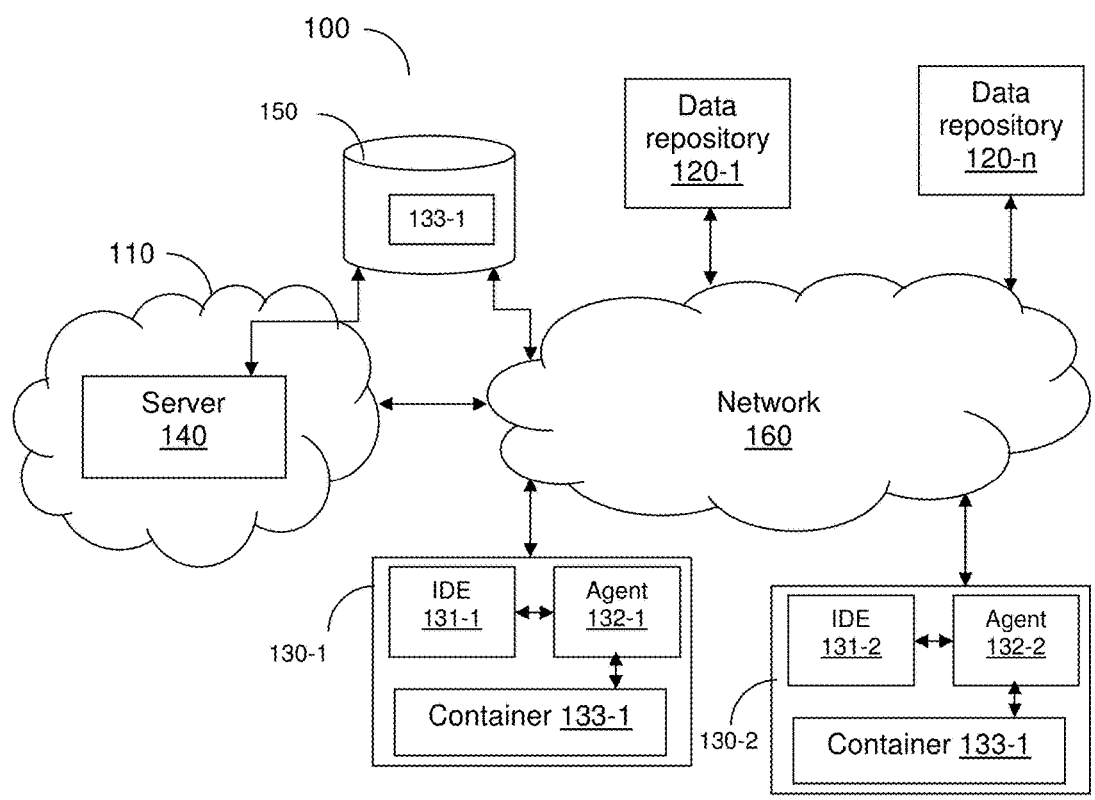
FIG. 1 is a schematic diagram of a networked system utilized to describe the disclosed embodiments.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

FIG. 1 is an example diagram of a networked system 100 utilized to describe the various disclosed embodiments. The networked system 100 includes a cloud computing platform 110, a plurality of data repositories 120-1 through 120-N, computing devices 130-1 and 130-2, a server 140, and a data warehouse 150. The various elements of the system 100 are communicatively connected to a network 160. The network 160 may be, for example, a wide area network (WAN), a local area network (LAN), the Internet, and the like.

The cloud computing platform 110 may be a private cloud, a public cloud, or a hybrid cloud providing computing resources to applications or services executed therein. The plurality of data repositories 120-1 through 120-N (hereinafter individually referred to as a data repository 120 or collectively as data repositories 120) are resources to computational algorithms. In the context of the disclosed embodiments, a computational algorithm is any algorithm that can be utilized in the field of mathematics and/or computer science. Such an algorithm is typically defined as a self-contained step-by-step set of operations to be performed. As an example, a computational algorithm may be designed to perform calculation, data processing and analysis (such as, image processing, transaction processing), automated reasoning, and more.

The computational algorithms may be included in text books, scientific or academic publications (e.g., articles or magazines), blogs, manuals, tutorials (textual or video), and so on. A computational algorithm saved in a data repository may be described in a format of pseudo code, one or more mathematical equations, a written description, a code sample or samples, or any combination thereof.

The computing devices 130-1 and 130-2 may include, for example, a personal computer, a laptop, a tablet computer, a smartphone, and the like. Each computing device 130 is utilized by a user to develop a software application, and as such includes an integrated development environment (IDE) 131 or any other tool that allows computer programmers to develop software.

Each computing device 130 further includes an agent 132 locally installed and executed over the computing device 130. According to various embodiments, the agent 132 is configured to scan any code developed in the IDE 131. Based on the code scanning, one or more software containers (or image containers) 133 are generated. The generated containers 133 are sent by the agent 132 to the server 140, to the data warehouse 150, or to both. The agent 132 is further configured to interface with the server 140 to retrieve the containers 133 and to integrate the retrieved containers 133 in a software program developed by the user.

Thus, according to the disclosed embodiments, an agent 132 has at least two primary roles: generating the containers 133, and integrating the generated containers 133 in a software program developed in the IDE 131. In an embodiment, the integration of the containers includes compiling or loading the containers 133 into code provided by the IDE 131.

These roles are realized by the agents 132 operable in the computing devices 130-1 and 130-2. In an example embodiment, the computing device 130-1 is operated by an author of the algorithm (e.g., the agent 132-1 generates containers 133-1), while the computing device 130-2 is used by a user of the containers (e.g., the agent 132-2 may integrate the containers 133-1 in the code).

It should be noted that the author and/or any user of the computing devices 130-1 and 130-2 may be, but is not limited to, an engineer, a programmer, a researcher, a developer, or any person with skill in the field of computer programming.

As an example, an author, using the computing device 130-1, develops an algorithm to compute an average of student grades. The agent 132-1 is configured to scan this algorithm to provide a container descriptor and to generate a container 133-1 respective of the container descriptor. The generated container 133-1 encapsulates all the software resources required for executing the algorithm. In an embodiment, the generated container 133-1 includes a data set serving as an input for the algorithm. The process for providing the container descriptor and generating the containers 133 is discussed in detail below.

It should be emphasized that the container descriptor can be generated based on any format that the algorithm is presented in, e.g., a pseudo code, a code sample, an executable code, equations, and so on. It should be further emphasized that the algorithm can be defined using the IDE 131-1, locally saved in the computing device 130-1, or downloaded from any data repositories 120.

A user of the computing device 130-2 can download the container 133-1 (as in the above example, to compute an average) and integrate the container 133-1 in any software program developed by means of the IDE 131-2. The process of the downloading, integrating, or otherwise executing the container 133-1 on the computing device 130-2 is facilitated by means of the agent 132-2.

Specifically, the agent 132-2 provides the container 133-1 with a complete set of interfaces to the computing environment. That is, any input to, or output generated by, the container 133-1 is received or sent through the agent 132-2. As an example, the agent 132-2 interfaces between the container 133-1 to the IDE 131-2, the server 140, and an operating system and file system of the computing device 130-2. The agent 132-2 is also configured to install all software resources required for the execution of the container 133-1 on the computing device 130-2.

According to the disclosed embodiments, the container 133-1 includes such software resources and the agent 132-2 is configured to select those resources that are needed for the proper execution of the container's 133-1 code. It should be noted that the agent 132-2 can check which resources are required for installation and which are not. For example, assuming the container's 133-1 code is in Python, the agent installs a Python native in the container 133-1. As such, the container 133-1 including the Python installation can be executed on any computer regardless of whether the computer includes Python native. Alternatively, the container 133-1 may call to install Python native on-the-fly. Thus, for example, if the agent 132-2 detects that the operating system of the device 130-2 does not support Python, then the agent 132-2 causes installation of the native Python on the device 130-2, on the fly. Thus, in some embodiments, the user is not required to install any files, and these techniques may further allow seamless sharing and execution across different devices.

In another embodiment, the agent 132-2 is further configured to provide the IDE 133-1 with the code included in the container 133-2 to enable the display of such code in the IDE 133-1.

Certain tasks performed by the agents 132 can be carried out, alternatively or collectively, by the server 140. Specifically, in an embodiment, the server 140 is configured to receive a container descriptor from an agent 132-1 and to generate the container 133-1 respective thereof. In yet another embodiment, containers 133 can be executed by the server 140, and their inputs/outputs will be communicated to the respective agent 132 through an API. As an example, a container 133-1 for computing averages can receive an input data set (e.g., a list of student grades) provided to the server 140 by the agent 132-2, and upon execution of the container 133-1 by the server 140, the average is returned to the agent 132-2. The input data set is part of the container 133-1.

In order to allow execution of a container 133, the server 140 is configured to create or instantiate a computing environment that supports the execution of the container 133. For example, if a container 133 includes a Python code, a virtual machine (not shown) that can run Python is instantiated by the server 140. In an embodiment, the creation of computing environments for running containers 133 can be performed on-demand (e.g., upon receiving a request to run a container). In another embodiment, computing environments utilized by "popular" containers (e.g., computing environments utilized above a predefined threshold number of times during a given time period) are always available.

In a further embodiment, the resources produced during the execution of a container 133 are cached, for example, in a cache memory (not shown) connected to the server 140. The cached resources may include, for example, installation files, compilation files, results output by the container, combinations thereof, and the like. In another embodiment, the cache memory can be shared among different computing environments (e.g., "workers") created to execute the containers. This sharing of cache memory allows for sharing cached resources among the computing environments. It should be appreciated that the cached resources produced in one worker can be used by other workers without requiring re-compilation, thereby accelerating the execution and accessibility to containers. It should be noted that the cached resources are available to containers executed by the agents 132 on user devices 130 or to the server 140.

Specifically, cached resources is based in part on the memory's state during code execution including all variables, matrixes, figures, intermediate/temporarily files, result files. The cached resources can be saved in the platform's centralized data repository, on a ready to execute "warm" worker, or both with a synchronizing mechanism. Thus, caching the resources include sharing the resources between executions of a container by the same or different accounts and users.

The trigger to use cached resources is when, for example, the state of code, input data, packages, versions and configuration are detected as the same or similar enough to generate the same resources.

As an example, execution of empty spaces or lines, comments, or certain pieces of code can be avoided using the cached resources. That is, such resources can be utilized instead of executing their respective pieces of code. The execution can them resume from that point to either execute new code according to user request or predefined code that will be executed from the shared resources point and forward automatically.

In an embodiment, shared resources can also be utilized during the compilation stage, where certain compilation steps are not performed. To this end, the state of the code and cached (shared) resources are identified, and compilation, execution and/or synchronization of shared resources is not performed.

In another embodiment, the server 140 is further configured to create the containers 133 based on the container descriptors provided by the agents 132. The generated containers 133 are saved in the data warehouse 150. The process for generating the container descriptors and containers is described below.

According to some embodiments, a search for containers 133 and the respective algorithms they carry out can be performed by any device communicatively connected to the server 140. As noted above, the containers are saved in the data warehouse 150.

In order to create searchable containers 133, metadata is generated and associated with each container 133 saved in the data warehouse 150. The metadata may be generated by the server 140 and/or by an agent 132. The metadata may include, but is not limited to, a container name, a container creation date, an algorithm name, an author of the algorithm, similar or related algorithms, user interaction, combinations thereof, and so on. The user interaction metadata lists how users downloaded or executed a specific container, the number of repetitions of a container per user, a benchmark, combinations thereof, and so on. In an exemplary embodiment, a ranking process is implemented to rank matching containers to a user query respective of the generated metadata. The search may be performed through a web interface (e.g., a portal) communicatively connected to the server 140.

In an embodiment, the ranking may be based, in part, on the user interaction information contained in the metadata. For example, a ranking score indicative of the popularity of a container may be computed using the number of runs, the number of views, and the number of downloads. The containers and/or their respective printed publications will be ranked based on their computed scores.

According to some disclosed embodiments, the evaluation of the performance and/or functionality of an algorithm can be also performed through the web interface. An exemplary and non-limiting screenshot of a webpage 200 for evaluating an algorithm is provided in FIG. 2. The webpage 200 is rendered by the web interface.

Figure 2:
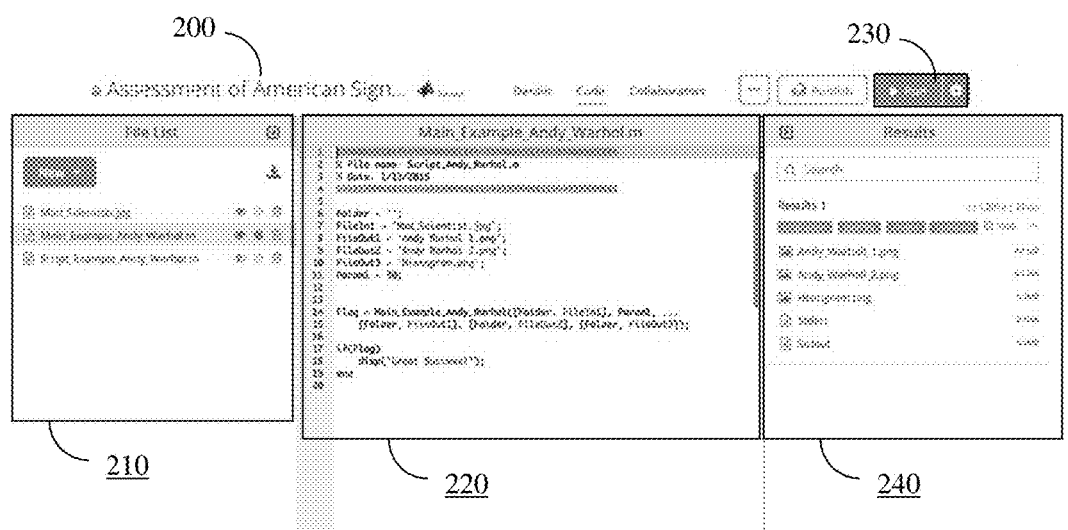
FIG. 2 is an exemplary and non-limiting screenshot of a webpage rendered for evaluating an algorithm according to one embodiment.

In the example shown in FIG. 2, the algorithm is for a recognition program written in Matlab® code. The webpage 200 may display the code associated with a container generated for the algorithm. In this example, the algorithm is composed from 3 files listed in the file list 210. The contents of each file can be viewed and edited in the section 220 of the webpage 200. Any changes to the code are saved to the data warehouse 150. Also, the changes are associated with the respective container.

Once the user clicks the "Run" button 230, the respective container generated for the recognition algorithm (and any changes therein) is executed by the server 140. The results of the execution are displayed in the results section 240.

According to various embodiments, the server 140 is configured to benchmark an algorithm through its respective container. To this end, an input data set is predefined to be utilized by containers designed to execute similar algorithms. The server 140 is configured to execute each container and to measure performance parameters. The parameters may be global parameters and/or specific parameters. The global parameters are agnostic to the purpose of the algorithm, while the specific parameters are related to the purpose/function of the algorithm. For example, global parameters may include execution time, memory, CPU and/or bandwidth utilization, and so on. The specific parameters may be, for example, a compression ratio for lossless compression algorithms.

In a further embodiment, the agent is configured to generate a user interface, e.g., a graphical user interface, based on the container's code. The developer of the container would not be required to code any GUI for inputting data or outputting the results. The developer is merely required to specify which variables are input variables.

The agent is configured to scan the code, to identify the specified input variables and their types, to generate GUI elements respective of such variables, and to display the generated GUI elements according to a specific order in which the input should be received. The agent is further configured to provide an output window for displaying the execution's results.

The generated GUI enables easy and fast interaction with the executed computational algorithm. For example, a user evaluating the computational algorithm is not required to enter a series of datasets through a command line.

In an embodiment, the number of downloads of containers and/or the execution of the containers by a user are tracked. This allows for monetization of the usage of containers, for example, via compensation per download or per execution.

As noted above, each container generated according to the disclosed embodiments can be shared among different users, thereby allowing collaboration among users. The sharing of containers can be on many levels, i.e., the entire container, input data sets, results, the container's code, or a combination thereof, can be shared. In an embodiment, two or more users can work on code of a single container. To this end, a version (or source) control is implemented to record changes to a container's code so that a user can recall specific versions as needed.

It should be noted that the disclosed embodiments allow a programmer to develop a software application including a plurality of containers that may execute the same or different algorithms. Specifically, in an embodiment, a global container is created and integrated in the code. The global container can be executed on any computing (or programming) environment. When executed, the global container can call other different containers to run the respective algorithm.

Typically, a software license is required to execute a code. For example, a Matlab® license is needed to run Matlab® code. According to various disclosed embodiments, a license manager is implemented by any of the agents 132 on the server 140. The license manager checks if a valid license exists on the local device before running a container that contains a code that requires a license. If so, execution of the container on the local device is enabled. Otherwise, the request is sent to the server 140 to grant a temporary license for executing the container. The temporary license may be restricted to a predefined time period, a number of executions of the same container, and/or a number of executions of the different containers. In an embodiment, a monetization method is associated with the temporary licenses. That is, a user granting such a license may be billed for the service.

In another embodiment, containers stored in the data warehouse 150 can be associated with computational algorithms included in printed text books, scientific, and/or academic publications. The association is achieved using, for example, a QR code minted in the printed publication. A user, by means of a device 130, can access the containers in the data warehouse 150 by simply scanning the QR code. Containers accessed through QR codes are retrieved and saved in the server 140 to allow execution by the user device 130. In an embodiment, all such containers are also listed in a user account, allowing the user to easily access and execute the containers at a later time.

In some implementations, the server 140 typically includes a processing system (not shown) connected to a memory (not shown). The memory contains a plurality of instructions that are executed by the processing system. Specifically, the memory may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The processing system may comprise or be a component of a larger processing system implemented with one or more processors. The one or more processors may be implemented with any combination of general-purpose microprocessors, microcontrollers, digital signal processors (DSPs), field programmable gate array (FPGAs), graphics processing units (GPUs), programmable logic devices (PLDs), controllers, state machines, gated logic, discrete hardware components, dedicated hardware finite state machines, or any other suitable entities that can perform calculations or other manipulations of information.

In some implementations, the agents 132-1 and 132-2 can operate and be implemented as a stand-alone program or, alternatively, can communicate and be integrated with other programs or applications executed in the client device 130.

In certain configurations, either or each of the agents 132-1 and 132-2 can be realized as a hardware component, such as a general-purpose microprocessor, microcontroller, a DSP, a FPGA, a PLD, a controller, a state machine, gated logic, a discrete hardware component, a dedicated hardware finite state machine, or any other suitable entities that can perform calculations or other manipulations of information.

It should be understood that the embodiments disclosed herein are not limited to the specific architecture illustrated in FIG. 1 and other architectures may be equally used without departing from the scope of the disclosed embodiments. Specifically, the server 140 may reside in the cloud computing platform 110, a different cloud computing platform or datacenter. Moreover, in an embodiment, there may be a plurality of servers 140 operating as described hereinabove and configured to either have one as a standby, to share the load between them, or to split the functions between them.

Figure 3:
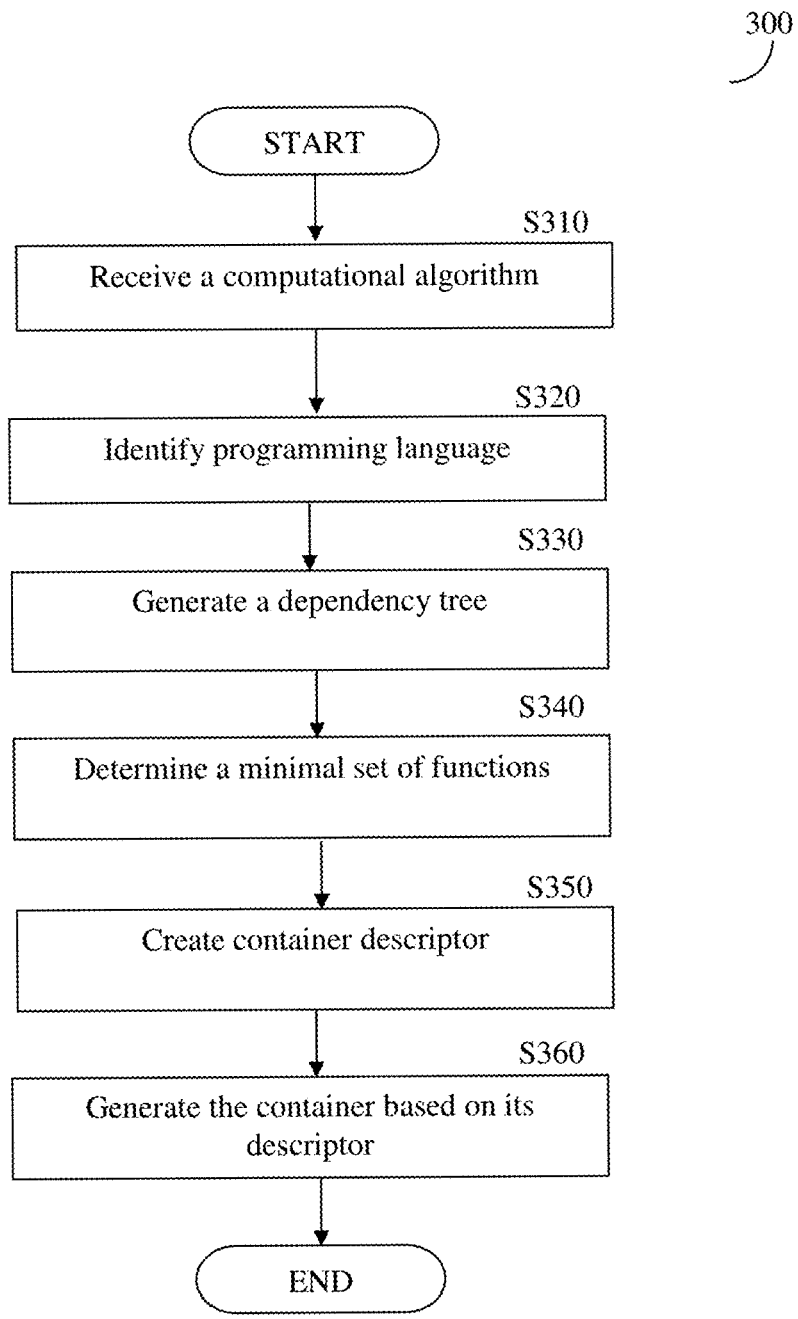
FIG. 3 is a flowchart illustrating a method for generating a container according to one embodiment.

FIG. 3 depicts an example flowchart 300 illustrating a method for generating a container for a computational algorithm according to one embodiment.

At S310, a textual description of a computational algorithm is received. The textual description may be in a format of a pseudo code, one or more mathematical equations, a written description, a code sample or samples, any combination thereof, and the like.

At S320, if available, the programming language of the received algorithm is identified. The identification may be based on the file extension name, reserved words in the received textual description, keywords, syntax characters (e.g., '{' '}'; indentations, etc.), and so on. The programming language is any high-level programming language that may or may not require compiling by another program. Preferably, the programming language is a scripting language.

At S330, the received algorithm's textual description is analyzed to generate a dependency tree. At S340, based, in part, on the dependency tree, a minimal set of functions that should be included in the container is determined. In an embodiment, the output of S320 is utilized for the analysis at S340. The operation of S330 and S340 will now be described with reference to FIG. 4 that depicts a schematic diagram of a dependency tree 400.

The textual description (code) of the algorithm utilized to generate the example dependency tree 400 is:

```
#!/usr/bin/env python
import os
from sys import path
from shutil import rmtree
from wand.image import Image
from wand.display import display
from lib.images import *
os.chdir('/data/')
image='testing image.jpg'
resized_image=get_resized_image(image, 100, 120)
display(resized_image)
```

The textual description is a Python script. Typically, execution of a Python script requires installation of a Python environment. Further, any Python environment typically requires native Python. The received code is scanned to determine which libraries and their functions (if any) are needed for the code's execution. Such libraries and functions are identified based on the "from < > import < >" syntax.

Figure 4:
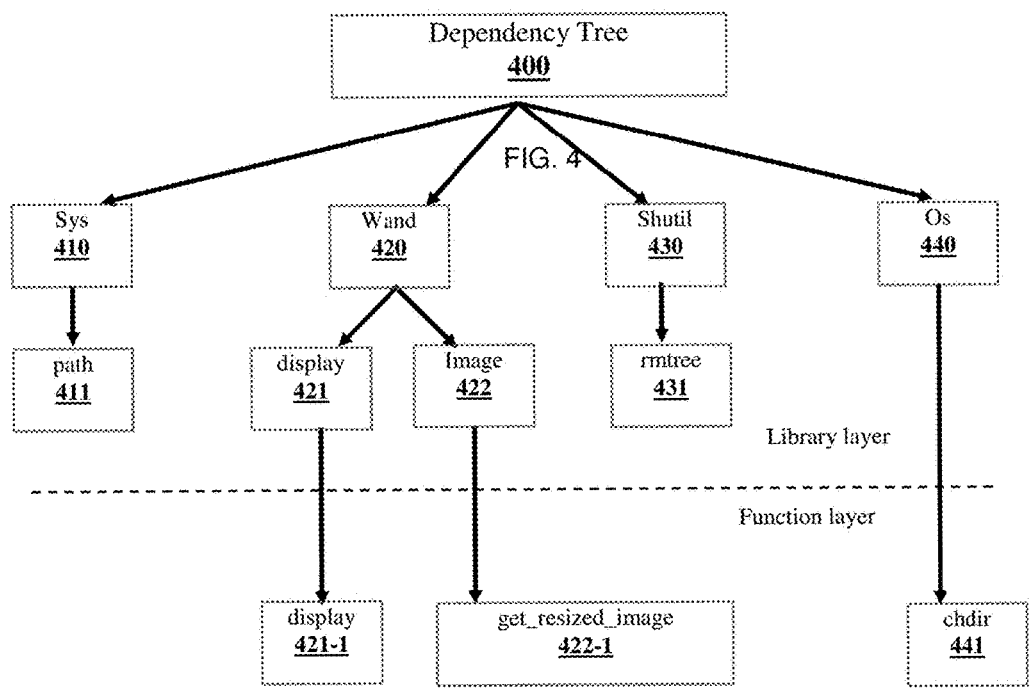
FIG. 4 is a schematic diagram of a dependency tree generated according to one embodiment.

As shown in FIG. 4, the required libraries are: 'path' 411 from 'sys' 410 library, 'display' 421 and 'image' 422 from the 'wand' 420 library, 'rmtree' 431 from the 'shutil' 430 library, as well 'os' 440. The required functions are 'display' 421-1 from the 'display' library, 'get_resized_image' 422-1 from the 'image' library, and 'chdir' 441 from the 'Os' library.

The analysis of the code (using, e.g., the identified programming language) indicates that the libraries 'sys' 410 and 'os' 440 are part of the native Python. Therefore, the minimal set of functions (in addition to native Python) that should be installed (or included) in the container are the 'display' 422-1 and 'get_resized_image' 423-1. The 'chdir' is part of the native Python that must be included in a container for executing the above example code.

It should be noted that the analysis of the code and the generation of the dependency tree ensure generation of compact containers. That is, for example, the 'wand' library 420 includes many sub-libraries, and each sub-library includes many functions. Thus, instead of generating a container that contains the entire 'wand' library 420, only the 'get_resized_image' 422-1 would be included in the container.

Referring back to FIG. 3, where at S350, a container descriptor is created based on the analysis performed at S340. The container descriptor lists, at least, a minimal set of resources and their dependencies that should be included in the container. Referring to the example described herein above with respect to FIG. 4, the container descriptor would list a Python native and the functions 'display' and 'get_resized_image'.

In an embodiment, the container descriptor is created in a format that is supported by the type of container to be generated. For example, if such container type is Docker, the container descriptor format is a Dockerfile. A Dockerfile (container descriptor) is a script composed of various instructions and arguments that, when successively executed, perform actions on a container descriptor in order to generate a new container.

At S360, a container for executing the received algorithm is generated using the container descriptor. As a non-limiting example, such container may be a Docker container. In an embodiment, the container is generated from a "base" container descriptor which defines mandatory resources for the proper execution of the algorithm. Referring back to the above example, the base container descriptor may define native Python and the new container would include the additional functions 'display' and 'get_resized_image'. In an embodiment, the user can edit or modify the container descriptor or any container generated thereof.

The various embodiments have been discussed herein with a reference to a software container. The software container can be replaced with a virtual machine, a light virtual machine, or any applicable virtualization technologies without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for automatically creating executable software code from a textual description of a computational algorithm, comprising:
   receiving in electronic form, by a first electronic computing device, a textual description of a computational algorithm;
   generating automatically, by a second electronic computing device, a software container based on the received textual description;
   instantiating automatically, by a third electronic computing device, a computing environment, wherein the computing environment includes computing resources configured to support execution of the software container; and
   executing, by a fourth electronic computing device, the software container in the instantiated computing environment;
   wherein generating the software container further comprises:
      analyzing the received textual description to generate a dependency tree;
      determining, based at least on the generated dependency tree, a minimal set of functions and resources to be included in the software container;
      generating a container descriptor based on the determined minimal set of functions and resources; and
      generating the software container using the container descriptor.

2. The method of claim 1, further comprising:
   saving the software container in a data warehouse.

3. The method of claim 2, further comprising:
   generating metadata indicating at least the contents of the software container; and
   indexing the software container stored in the data warehouse using the generated metadata, thereby providing searchable software containers.

4. The method of claim 1, wherein the textual description may be in a format of at least one of: pseudo code, a mathematical equation, a written description, and a code sample.

5. The method of claim 1, wherein the textual description is extracted from at least one printed publication.

6. The method of claim 1, wherein the textual description is uploaded by a user.

7. The method of claim 1, further comprising:
   benchmarking the computational algorithm based on the execution of the software container.

8. The method of claim 7, further comprising:
   providing a unified input for the execution of the software container, wherein the unified input is the same for all software containers being benchmarked; and
   measuring performance parameters during the execution of the software container, wherein each of the performance parameters is any of: agnostic to functions performed by the computational algorithm, and specific to at least one function performed by the computational algorithm.

9. The method of claim 1, wherein at least two of the first, second, third, and fourth electronic computing devices are part of a single physical electronic computing device.

10. The method of claim 1, further comprising:
    identifying a programming language for the computational algorithm; and
    determining the minimal set of functions and resources based on the identified programming language.

11. The method of claim 10, wherein the instantiated computing environment includes resources selected based on the identified programming language.

12. The method of claim 1, wherein instantiating the computing environment further comprises:
    instantiating the computing environment on-demand.

13. The method of claim 1, further comprising:
    caching resources produced during execution of the software container, wherein the resources include at least one of compilation files, installation files, and the results.

14. The method of claim 13, wherein the cached resources are shared among a plurality of computing environments.

15. A non-transitory computer readable medium having stored thereon instructions for causing one or more processing units to execute a method for automatically creating executable software code from a textual description of a computational algorithm comprising the steps of:
    receiving a textual description of a computational algorithm;
    generating a software container based on the received textual description;
    instantiating a computing environment on a computing device, wherein the computing environment includes computing resources configured to support execution of the software container; and
    executing the software container in the computing environment;
    wherein generating the software container further comprises
       analyzing the received textual description to generate a dependency tree;
       determining, based at least on the generated dependency tree, a minimal set of functions and resources to be included in the software container;
       generating a container descriptor based on the determined minimal set of functions and resources; and
       generating the software container using the container descriptor.

16. A system for automatically creating executable software code from a textual description of a computational algorithm, comprising:
    a processing system; and
    a memory, the memory containing instructions that, when executed by the processing system, configure the system to:
    receive a textual description of a computational algorithm;
    generate a software container based on the received textual description by
       analyzing the received textual description to generate a dependency tree;
       determining, based at least on the generated dependency tree, a minimal set of functions and resources to be included in the software container;
       generating a container descriptor based on the determined minimal set of functions and resources; and
       generating the software container using the container descriptor;
    instantiate a computing environment on a computing device, wherein the computing environment includes computing resources configured to support execution of the software container; and
    execute the software container in the computing environment.

17. The system of claim 16, wherein the system is further configured to:
  save the software container in a data warehouse.

18. The system of claim 17, wherein the system is further configured to:
  generate metadata indicating at least the contents of the software container; and
  index the software container stored in the data warehouse using the generated metadata, thereby providing searchable software containers.

19. The system of claim 16, wherein the textual description may be in a format of at least one of: pseudo code, a mathematical equation, a written description, and a code sample.

20. The system of claim 16, wherein the textual description is extracted from at least one printed publication.

21. The system of claim 16, wherein the textual description is uploaded by a user.

22. The system of claim 16, wherein the system is further configured to:
  benchmark the computational algorithm based on the execution of the software container.

23. The system of claim 22, wherein the system is further configured to:
  provide a unified input for the execution of the software container, wherein the unified input is the same for all software containers being benchmarked; and
  measure performance parameters during the execution of the software container, wherein each of the performance parameters is any of: agnostic to functions performed by the computational algorithm, and specific to at least one function performed by the computational algorithm.

24. The system of claim 17, wherein the processing system and memory are each distributed amongst at least two physical electronic computing devices.

25. The system of claim 16, wherein the system is further configured to:
  identify a programming language for the computational algorithm; and
  determine the minimal set of functions and resources based on the identified programming language.

26. The system of claim 25, wherein the computing environment includes resources selected based on the identified programming language.

27. The system of claim 25, wherein the system is further configured to:
  instantiate the computing environment on-demand.

28. The system of claim 16, wherein the system is further configured to:
  cache resources produced during execution of the software container, wherein the resources include at least one of compilation files, installation files, and the results.

29. The system of claim 28, wherein the cached resources are shared among a plurality of computing environments.

30. The system of claim 14, wherein the system is configured to host the computing environment.

* * * * *